US008024172B2

(12) United States Patent
Trimmer et al.

(10) Patent No.: US 8,024,172 B2
(45) Date of Patent: Sep. 20, 2011

(54) METHOD AND SYSTEM FOR EMULATING TAPE LIBRARIES

(75) Inventors: Don Alvin Trimmer, Livermore, CA (US); Roger Keith Stager, Livermore, CA (US); Craig Anthony Johnston, Livermore, CA (US); Yafen Peggy Chang, Fremont, CA (US); Gavin David Cohen, Dublin, CA (US); Rico Blaser, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 735 days.

(21) Appl. No.: 10/314,637

(22) Filed: Dec. 9, 2002

(65) Prior Publication Data
US 2004/0111251 A1 Jun. 10, 2004

(51) Int. Cl.
G06F 9/455 (2006.01)
G06F 13/00 (2006.01)
G06F 13/28 (2006.01)
(52) U.S. Cl. .............................. 703/26; 703/24; 711/111
(58) Field of Classification Search .................... 703/26, 703/24; 711/111
See application file for complete search history.

(56) References Cited

U.S. PATENT DOCUMENTS

| 4,635,145 A | | 1/1987 | Horie et al. |
| 4,727,512 A | * | 2/1988 | Birkner et al. ................. 703/24 |
| 4,775,969 A | | 10/1988 | Osterlund |
| 5,212,784 A | | 5/1993 | Sparks |
| 5,235,695 A | | 8/1993 | Pence |
| 5,297,124 A | * | 3/1994 | Plotkin et al. .................. 360/49 |
| 5,438,674 A | | 8/1995 | Keele et al. |
| 5,455,926 A | * | 10/1995 | Keele et al. ...................... 711/4 |
| 5,485,321 A | | 1/1996 | Leonhardt et al. |
| 5,579,516 A | | 11/1996 | Van Maren et al. |
| 5,666,538 A | | 9/1997 | DeNicola |
| 5,673,382 A | | 9/1997 | Cannon et al. |
| 5,745,748 A | | 4/1998 | Ahmad et al. |
| 5,774,292 A | | 6/1998 | Georgiou et al. |
| 5,774,643 A | | 6/1998 | Lubbers et al. |
| 5,774,715 A | | 6/1998 | Madany et al. |
| 5,794,013 A | * | 8/1998 | McBrearty ...................... 703/27 |
| 5,805,864 A | | 9/1998 | Carlson et al. |
| 5,809,511 A | | 9/1998 | Peake |
| 5,809,543 A | | 9/1998 | Byers et al. |
| 5,854,720 A | | 12/1998 | Shrinkle et al. |
| 5,859,979 A | | 1/1999 | Tung et al. |
| 5,864,346 A | | 1/1999 | Yokoi et al. |
| 5,872,669 A | | 2/1999 | Morehouse et al. |

(Continued)

FOREIGN PATENT DOCUMENTS

EP 1333379 4/2006

(Continued)

OTHER PUBLICATIONS

Alacritus Software, "Securitus I White Paper", Jul. 1, 2001 pp. 1-4.*

(Continued)

Primary Examiner — David Silver
(74) Attorney, Agent, or Firm — Perkins Coie LLP

(57) ABSTRACT

A method and system for emulating tape library commands is disclosed. Tape library commands implemented in response to commands received from a data protection application are emulated in a disk based storage medium so that existing data protection applications may be used to copy data to and from the disk based storage medium.

19 Claims, 3 Drawing Sheets

U.S. PATENT DOCUMENTS

| | | | |
|---|---|---|---|
| 5,875,479 A | 2/1999 | Blount et al. | |
| 5,911,779 A | 6/1999 | Stallmo et al. | |
| 5,913,062 A | 6/1999 | Vrvilo et al. | |
| 5,949,970 A | 9/1999 | Sipple et al. | |
| 5,961,613 A | 10/1999 | DeNicola | |
| 5,963,971 A | 10/1999 | Fosler et al. | |
| 5,974,424 A | 10/1999 | Schmuck et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A * | 5/2000 | Miller et al. | 710/20 |
| 6,070,224 A | 5/2000 | LeCrone et al. | |
| 6,098,148 A | 8/2000 | Carlson | |
| 6,128,698 A * | 10/2000 | Georgis | 711/111 |
| 6,131,142 A | 10/2000 | Kamo et al. | |
| 6,131,148 A | 10/2000 | West et al. | |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,304,882 B1 | 10/2001 | Strellis et al. | |
| 6,317,814 B1 | 11/2001 | Blendermann et al. | |
| 6,324,497 B1 * | 11/2001 | Yates et al. | 703/24 |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,354,748 B1 | 3/2002 | Vrvilo | |
| 6,360,232 B1 | 3/2002 | Brewer et al. | |
| 6,385,706 B1 | 5/2002 | Ofek et al. | |
| 6,389,503 B1 * | 5/2002 | Georgis et al. | 711/4 |
| 6,408,359 B1 | 6/2002 | Ito et al. | |
| 6,487,561 B1 * | 11/2002 | Ofek et al. | 707/204 |
| 6,496,791 B1 * | 12/2002 | Yates et al. | 703/25 |
| 6,499,026 B1 * | 12/2002 | Rivette et al. | 707/2 |
| 6,546,384 B2 | 4/2003 | Shaath et al. | |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 * | 7/2004 | Rieschl et al. | 719/321 |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 * | 12/2004 | Wood | 711/111 |
| 6,850,964 B1 | 2/2005 | Brough et al. | |
| 6,877,016 B1 | 4/2005 | Hart et al. | |
| 6,915,397 B2 | 7/2005 | Lubbers et al. | |
| 6,931,557 B2 | 8/2005 | Togawa | |
| 6,938,089 B1 | 8/2005 | Slaby et al. | |
| 6,950,263 B2 | 9/2005 | Suzuki et al. | |
| 6,957,291 B2 | 10/2005 | Moon et al. | |
| 6,959,368 B1 | 10/2005 | St. Pierre et al. | |
| 6,973,369 B2 | 12/2005 | Trimmer et al. | |
| 6,973,534 B2 | 12/2005 | Dawson | |
| 6,978,325 B2 | 12/2005 | Gibble | |
| 6,988,109 B2 | 1/2006 | Stanley et al. | |
| 7,032,126 B2 | 4/2006 | Zalewski et al. | |
| 7,032,131 B2 | 4/2006 | Lubbers et al. | |
| 7,055,009 B2 | 5/2006 | Factor et al. | |
| 7,069,466 B2 | 6/2006 | Trimmer et al. | |
| 7,072,910 B2 | 7/2006 | Kahn et al. | |
| 7,096,331 B1 | 8/2006 | Haase et al. | |
| 7,100,089 B1 | 8/2006 | Phelps | |
| 7,107,417 B2 | 9/2006 | Gibble et al. | |
| 7,111,136 B2 | 9/2006 | Yamagami | |
| 7,117,324 B2 | 10/2006 | Scheld | |
| 7,127,388 B2 * | 10/2006 | Yates et al. | 703/24 |
| 7,127,577 B2 | 10/2006 | Koning et al. | |
| 7,143,307 B1 | 11/2006 | Witte et al. | |
| 7,152,077 B2 | 12/2006 | Veitch et al. | |
| 7,155,586 B1 | 12/2006 | Wagner et al. | |
| 7,200,546 B1 * | 4/2007 | Nourmohamadian et al. | 703/24 |
| 7,308,528 B2 * | 12/2007 | Kitamura et al. | 711/111 |
| 7,389,313 B1 | 6/2008 | Hsieh et al. | |
| 7,567,993 B2 | 7/2009 | Trimmer et al. | |
| 2001/0047447 A1 | 11/2001 | Katsuda | |
| 2002/0004835 A1 * | 1/2002 | Yarbrough | 709/230 |
| 2002/0009907 A1 | 1/2002 | Kasai et al. | |
| 2002/0016827 A1 | 2/2002 | McCabe et al. | |
| 2002/0026595 A1 | 2/2002 | Saitou et al. | |
| 2002/0095557 A1 | 7/2002 | Constable et al. | |
| 2002/0133491 A1 | 9/2002 | Sim et al. | |
| 2002/0144057 A1 | 10/2002 | Li et al. | |
| 2002/0163760 A1 * | 11/2002 | Lindsey et al. | 360/134 |
| 2002/0166079 A1 | 11/2002 | Ulrich et al. | |
| 2002/0171546 A1 | 11/2002 | Evans et al. | |
| 2002/0174244 A1 | 11/2002 | Beckwith et al. | |
| 2002/0191608 A1 | 12/2002 | Lenell et al. | |
| 2002/0199129 A1 | 12/2002 | Bohrer et al. | |
| 2003/0004980 A1 | 1/2003 | Kishi et al. | |
| 2003/0014568 A1 | 1/2003 | Kishi et al. | |
| 2003/0037211 A1 | 2/2003 | Winokur | |
| 2003/0044834 A1 | 3/2003 | Daly et al. | |
| 2003/0097462 A1 | 5/2003 | Parent et al. | |
| 2003/0120476 A1 * | 6/2003 | Yates et al. | 703/24 |
| 2003/0120676 A1 * | 6/2003 | Holavanahalli et al. | 707/102 |
| 2003/0126388 A1 | 7/2003 | Yamagami | |
| 2003/0135672 A1 * | 7/2003 | Yip et al. | 710/72 |
| 2003/0149700 A1 * | 8/2003 | Bolt | 707/101 |
| 2003/0182301 A1 | 9/2003 | Patterson et al. | |
| 2003/0182350 A1 | 9/2003 | Dewey | |
| 2003/0188208 A1 | 10/2003 | Fung | |
| 2003/0217077 A1 | 11/2003 | Schwartz et al. | |
| 2003/0225800 A1 | 12/2003 | Kavuri | |
| 2004/0015731 A1 | 1/2004 | Chu et al. | |
| 2004/0098244 A1 * | 5/2004 | Dailey et al. | 703/24 |
| 2004/0153614 A1 * | 8/2004 | Bitner et al. | 711/162 |
| 2004/0181388 A1 * | 9/2004 | Yip et al. | 703/25 |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 * | 3/2006 | Matze et al. | 711/114 |
| 2006/0047925 A1 | 3/2006 | Perry | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 * | 6/2006 | Matze et al. | 711/111 |

FOREIGN PATENT DOCUMENTS

| | | |
|---|---|---|
| EP | 1 671 231 | 6/2006 |
| EP | 1 671231 | 6/2006 |
| WO | WO99/03098 | 1/1999 |
| WO | WO99/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Alacritus Software's Securitus I: Pointing the Way to Virtual Tape Libraries" Aberdeen Group, Inc., Mar. 2002.

"Securitus White Paper: Disk Based Data Protection from Alacritus Software" Oct. 2003.

Robinson, Simon, "Alacritus Lines Up OEM Partners for Virtual Tape Library Push" Oct. 4, 2002.

"Product Brief: Rhapsody/Alacritus-Securitus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

Komiega, Kevin, "Vendor Pushes Disk Backup Over Tape" Jan. 10, 2003.

"Alacritus, Hitachi CP and Nissho Team to Create Virtual Tape Library Appliance: Industry's First Virtual Tape Library Appliance to Replace Storage Tape Libraries" Alacritus Software, Inc. Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library for Legato NetWorker Data Protection Solution" Alacritus Software, Inc., Jan. 8, 2002.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup performance and Scalability" Alacritus Software, Jul. 8, 2002.

Camphuisen, Alicia, "Hitachi Inks OEM Deal with Legato" Knapp Comm., Jul. 17, 2002.

"Alacritus Announces Disk-Based Successor to Tape" Knapp Comm., Aug. 21, 2002.

Biggar, Heidi, "Alacritus Enables Disk-Based Backup" InfoStor, Sep. 2001.

"Securitus/White Paper: Disk Based Data Protection for Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Disk-Based Data Protection" Alacritus Software, Inc., Sep. 2002.

"Virtual Tape Library Technology Brochure" Alacritus Software, Inc., Jul. 2001.

"Disk-Based Data Protection" Alacritus Software, Inc., Sep. 2001.

"Alacritus Announces Disk-Based Successor to Tape" Knapp Comm., Jul. 17, 2002.

"Securitus I White Paper: Disk Based Data Protection for Alacritus Software" Alacritus Software, Inc., Jul. 2001.

"Disk-Based Protection" Alacritus Software, Inc., Sep. 2002.

Komiega, Kevin, "Vendor Pushes Disk Backup Over Tape" SearchStorage.com, Jan. 10, 2003.

Payack, Paul JJ "Alacritus Lines Up OEM Partners for Virtual Tape Library Push" The (451) Storage & Systems, Oct. 4, 2002, pp. 1-5.

Baltazar, Henry "Weaving Apps into SAN Fabric", eWEEK, Mar. 24, 2003, pp. 1-2.

Co-pending U.S. Appl. No. 10/314,690 filed Dec. 9, 2002.

Non-Final Office Action Mailed Jan. 3, 2006 in Co-pending U.S. Appl. No. 10/314,690 filed Dec. 9, 2002.

Final Office Action Mailed Jul. 20, 2006 in Co-pending U.S. Appl. No. 10/314,690 filed Dec. 9, 2002.

Non-Final Office Action Mailed Jan. 11, 2007 in Co-pending U.S. Appl. No. 10/314,690 filed Dec. 9, 2002.

Final Office Action Mailed Aug. 21, 2007 in Co-pending U.S. Appl. No. 10/314,690 filed Dec. 9, 2002.

Non-Final Office Action Mailed Apr. 11, 2008 in Co-pending U.S. Appl. No. 10/314,690 filed Dec. 9, 2002.

Final Office Action Mailed Oct. 14, 2008 in Co-pending U.S. Appl. No. 10/314,690 filed Dec. 9, 2002.

Notice of Allowance Mailed Apr. 3, 2009 in Co-pending U.S. Appl. No. 10/314,690 filed Dec. 9, 2002.

Co-pending U.S. Appl. No. 10/218,249 filed Aug. 14, 2002.

Non-Final Office Action Mailed Feb. 18, 2005 in Co-pending U.S. Appl. No. 10/218,249 filed Aug. 14, 2002.

Final Office Action Mailed Aug. 4, 2005 in Co-pending U.S. Appl. No. 10/218,249 filed Aug. 14, 2002.

Notice of Allowance Mailed Jan. 23, 2006 in Co-pending U.S. Appl. No. 10/218,249 filed Aug. 14, 2002.

* cited by examiner

METHOD AND SYSTEM FOR EMULATING TAPE LIBRARIES

BACKGROUND

The present invention relates to data protection and more particularly to emulating commands that are implemented by physical tape libraries (PTLs) to facilitate communication and data movement between a PTL and data protection applications (DPAs). The commands are emulated so that backup data may be copied from DPAs to disk-based virtual tape libraries (VTLs) without requiring the DPA to support disk as a backup medium. In other words, a tape library interface is added to a standard disk array.

Data protection (which includes backing up computer data, restoring computer data, securing computer data, and managing computer data storage) and disaster recovery procedures are essential processes to organizations that use computers. In fact, data protection is the single most expensive storage administrative task. Most large organizations perform data backups to tape media and use a robotically-controlled tape library or tape jukebox to assist with backup automation. Performing and managing backups and restores involves many functions including, for example, media management (including tape tracking, rotation and off-site storage), tape jukebox management, file tracking, backup scheduling, assisted or automated data restore and data archival.

In order to effectively perform the above functions, a sophisticated DPA is required. Examples of such DPAs include, for example, Legato NetWorker, Veritas BackupExec and CA ArcServe. DPAs automate and assist with the essential functions of data protection.

DPAs are designed specifically to work with physical tapes, tape drives and PTLs. In fact, most of the complexities in DPAs relate to their interaction with those physical devices. Unfortunately, physical tape devices tend to be slow and error prone: tape robots fail, tape drives misbehave, tape media wears out or tears, etc. It would therefore be preferable to backup data to disk arrays, which are less error prone and perform better. Advanced Technology Attachment (ATA) disk drives have also reached price parity with tape media, which adds a large incentive to move from tape-based solutions to disk-based solutions. However, existing DPAs were designed to work with physical tape libraries and they encounter numerous difficulties when dealing with disk arrays.

It would therefore be desirable to add a tape library emulation layer to disk arrays that allows DPAs to read and write to disk arrays in the same fashion they read and write to tape.

SUMMARY

The invention is a method and system for emulating commands that are implemented by physical tape libraries (PTLs) to facilitate communication and data movement between a PTL and data protection applications (DPAs) so that backup data may be copied, as desired, between an existing DPA and a disk based virtual tape library (VTL). The VTL may be independently configured or configured to logically correspond to one or more existing PTL, as desired.

BRIEF DESCRIPTION OF THE DRAWING(S)

DETAILED DESCRIPTION OF THE PREFERRED EMBODIMENT(S)

Figure 1:
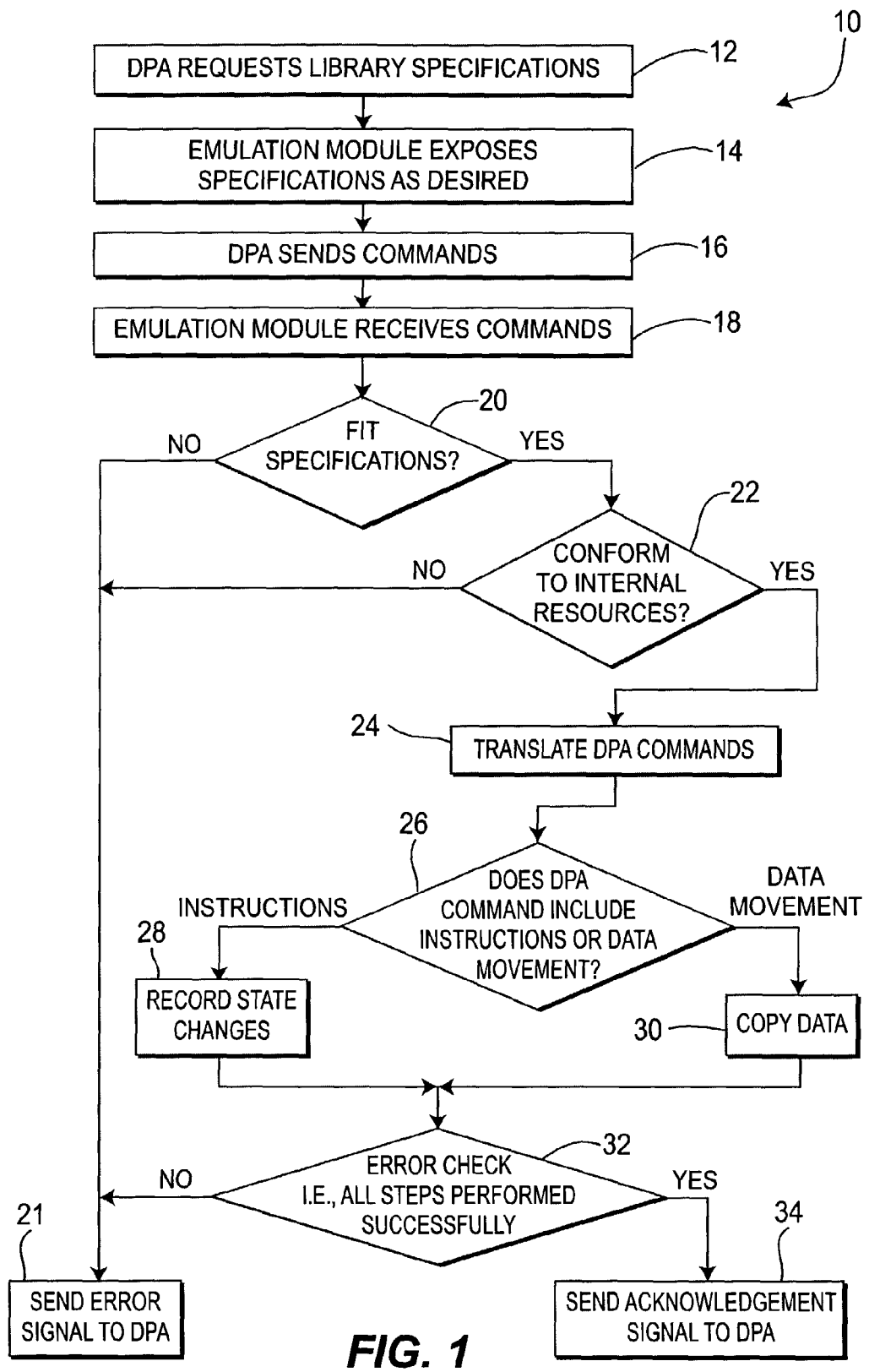
FIG. 1 is a diagram showing a method for emulating tape library commands in accordance with the preferred embodiment of the invention

Referring now to FIG. 1, a method 10 is shown for emulating tape library commands so that backup data may be copied between an existing DPA and a disk based VTL and vice versa, as desired. Emulating particular tape library commands allows a DPA to communicate with and write backup data to disk based devices that look and act like one or more PTLs. This allows existing DPAs to be used unchanged to write backup data to a disk based VTL.

For sake of clarity, backup data, for purposes of describing the preferred embodiments, is any data that has been backed-up from any type of computer network or application. Furthermore, the terms data and backup data may be used interchangeably throughout the specification.

In general, a VTL is a disk based repository or storage medium for backup data. The VTL is a logical representation of a PTL. By means of emulation, the VTL exhibits all the behaviors of a PTL—it appears to have a robotic arm, one or more tape drives, tape cartridge slots, mailbox (entry/exit) slots and a bar code reader. In reality, one or more of each of these devices are emulated in such a way that they can respond on the bus, small computer system interface (SCSI) or fibre channel (FC), in exactly the same way as PTLs do. Furthermore, the characteristics (i.e. how each library is emulated, such as the number of tape drives, etc.) of a VTL may be predetermined as desired and may be defined by VTL type.

A VTL type may be used to define how many tape drives and tape slots one of the libraries should have, as well as how the library should identify itself when probed on the bus. In other words, the VTL may be set up to logically contain, via emulation any of the typical components of a typical PTL. Therefore a VTL may simply be configured so that it logically contains any predetermined number of virtual slots and virtual cartridges, as desired. The logical configuration of a VTL is configured according to a set of specifications. The specifications may be modeled after an existing PTL or they may be independently created, as desired.

Similar to the VTL, a virtual tape is a logical representation of a physical tape. Virtual tapes are the emulated equivalent of physical tapes and are used inside VTLs and written to by virtual tape drives in the same way as physical tapes are written to by physical tape drives. When a virtual tape is created, a tape label is associated with it. This label is used to identify a particular virtual tape which in turn comprises particular virtual tape files written by the DPA, typically in a proprietary format. Tape labels in a VTL are reported to the DPA in exactly the same way as tape barcode labels are reported by a PTL. Copying the contents of a VTL is just as critical as copying the contents of a PTL when dealing with site failures. Copying the contents of a VTL, however, does not require a DPA and is much easier and more flexible. Furthermore, the disk based VTL is more reliable than tape media and a PTL.

When writing data to a VTL, the DPA records the data to the VTL in exactly the same format as if the DPA was writing the data to tape. While the DPA is writing data to the VTL, a log is kept of all write operations made by the DPA to the VTL. Maintaining the log of write operations allows the particular sequence in which the data was copied to the onsite VTL to be played back in the same way it was received from the DPA. This is done completely independently of the library emulation module and provides all of the benefits of disk based, randomly accessible, backup data while allowing, if necessary, physical tapes to be conveniently created without using the DPA. Physical tapes created by playing back data written to the VTL are equivalent to physical tapes created using a DPA.

Referring again to FIG. 1, the method 10 begins in step 12 with the DPA requesting the specifications (identifier, vendor ID, product ID, library geometry, etc.) of the library in which the backup data will be stored. This may happen only once when the DPA is installed or configured or it may happen repeatedly to update the configuration, especially if a new physical library is added, a new library is emulated or an existing virtual library configuration is changed. It should be noted that the method 10 is performed each time the DPA sends one or more commands, but starting at step 16 if the specifications are not requested. Therefore, where the DPA requests the specifications repeatedly, i.e. each time it sends one or more commands, step 12 ensures the specifications of the VTL is what the DPA expects them to be.

The specifications of a VTL, which as explained, may be used to identify particular types of VTLs, may already exist in a previously created file and, if so, will be automatically activated upon activation of the emulation module. Alternatively, the specifications of one or more VTLs (or changes to existing VTLs) may be inputted to the emulation module at any time after activation. As mentioned, the specifications of a VTL may correspond to the specifications of an existing PTL or they may be independently created.

By way of example, in situations where an organization has a PTL and DPA already in place and wishes to upgrade their PTL to a VTL, the VTL is logically configured to have the same specifications of the existing PTL. That is, if the existing PTL has 4 slots and 4 cartridges, the VTL is logically configured to include 4 slots and 4 cartridges. This allows the organization to keep the same workflows and DPA configuration, while transparently achieving the benefits of the VTL over the existing PTL. Whatever the specifications of a particular VTL is, those specifications may be inputted to the emulation module either upon activation or thereafter. Regardless of whether a VTL is modeled after an existing PTL or is independently created, the VTL is logically configured in the same format as a typical PTL. That is, a VTL will have W slots, X drives, Y cartridges, Z mailbox slots etc.

In step 14, an emulation module associated with the VTL exposes the specifications of the VTL, in accordance with the manner in which they were requested which, as mentioned, may vary. In step 16, the DPA sends commands for writing backup data. The DPA commands are received by the emulation module in step 18. If multiple DPAs share one VTL, a single emulation module can emulate a library for each DPA (configured independently) or the DPAs can be set up to share a single emulated library, as they would share a single PTL. Setting up multiple VTLs allows different types (and possibly incompatible) DPAs to share a single physical device that is centrally administered, while avoiding having to share the same library. The emulation can be configured in such a way that each DPA can only see its own emulated library. Alternatively, for each emulated library, hosts can be specified that are allowed to interact with the library. This can be accomplished via LUN mapping or network zoning.

In steps 20 and 22, the emulation module will confirm whether the commands may be executed. To confirm whether the DPA commands may be executed, the emulation module determines whether the commands fit the specifications of the VTL (step 20) and whether the commands conform to the VTL's internal resources (step 22).

With respect to whether the commands fit the VTL's specifications (step 20), the emulation module, for example, may check that the slot or cartridge asked for in the DPA commands is actually a slot or cartridge that was configured in the emulation module of the VTL. Therefore, if the DPA's commands asked for slot 5 and the VTL was only configured with slots 1-4, the DPA's command does not fit the specifications of the emulated library. If the commands do not fit the specifications, the method proceeds to step 21 where an error signal is sent to the DPA indicating that the commands sent by the DPA have not been executed. That is, the method creates an error condition analogous to an error condition created in a PTL in response to a DPA command referencing the $5^{th}$ slot in a PTL having only 4 slots.

It is important to note, however, that the emulation does not need to fit the physical characteristics of the back-end disk subsystem. For example, a virtual tape that logically corresponds to a physical tape can be configured to fit, for example, 40 GB of backup data, but, even if all 40 GB of data have yet to be used, the system will stop writing to that virtual tape when the corresponding physical tape would become full. That is, even if there is more space in the back-end disk subsystem, the emulation module will report to the DPA that the tape is full once that mark is reached.

If, the DPA's commands do fit the specifications of the VTL, the method proceeds to step 22 where the method determines whether the commands conform to the VTL's internal resources. In step 22, the emulation module, for example, may check to determine whether the VTL has sufficient disk space to receive the backup data. If the commands do not conform to the VTL's internal resources, the method proceeds to step 21 where an error signal is sent to the DPA, as explained above. If desired, the internal resources may be increased, as desired. It should be noted, however, that a negative determination in step 22 is avoidable. For example, disk space may be reserved for virtual tapes before any data is written on them so that the DPA won't expect more space on a virtual tape than is physically available on disk.

If the commands do conform to the VTL's internal resources, the method continues on to step 24. In step 24, the emulation module translates the relevant DPA commands to the format of the VTL so that the commands sent by the DPA may be carried out in the VTL. For example, sequential writes may be turned into non-sequential writes internally (for example to load-balance one or more data streams across multiple disks) and tape positioning or other tape specific commands can be ignored outside of the emulation module.

The format of the VTL may be any type of format that may be used for managing data in a disk based storage medium such as a VTL. Furthermore, there is relatively little variation between typical DPAs with respect to the commands that are used to write data to a PTL. Therefore, the emulation module is configured so that it may translate the relevant DPA commands of a variety of DPAs to any number of formats that may be used by the particular VTL. This enables a single emulation module to be used for a wide variety of DPA/VTL formats. Furthermore, a single emulation module may be used to emulate more than one PTL. In other words, a single disk array can be turned into multiple tape libraries of potentially different geometries and characteristics. For example, a 4 drive 40 slot Linear Tape Open (LTO) library can be emulated at the same time as a 1 drive 5 slot Digital Linear Tape (DLT) library within a single emulation module. Alternatively, a VTL can contain multiple emulation modules. This has tremendous implications in terms of library sharing because this functionality makes it possible to emulate a library for each server that needs to be backed up, which in turn completely avoids complicated library sharing procedures. Tape drives and even entire tape libraries are no longer a scarce resource but can be created on demand. Also, unlike in physical tape libraries, any bandwidth that is not used by one of the tape drives can be used by the remaining drives.

Once the DPA commands have been translated, the method proceeds to step 26. When a DPA sends a command to write data to a PTL, the command may include instructions necessary for copying data to a library as well as the data itself. Therefore, the command may require movement of the components of a typical PTL as well the actual writing of data. For example, a DPA command may include instructions such as a) fetch tape X from slot Y; b) put tape X in drive 1; c) copy data to location Z of tape X. In response to such a command, a PTL would d) move the robotic arm to slot Y; e) grab tape X; f move robotic arm to drive 1; g) release tape h) forward to location Z of tape X and i) copy data. VTLs, however, have no real moving parts, but emulate those commands by carrying them out virtually in order to trick the DPA into thinking it is dealing with a PTL.

The manner in which the VTL responds to the DPA's commands depends on whether the commands involve data movement (i.e. writing data to the VTL or retrieving data from the VTL) or instructions. For DPA commands having instructions such as "a" and "b," above, the VTL does not actually perform the same tasks that a PTL would (i.e. tasks "d" through "h"), but rather records the state changes caused by implementing those tasks. That is, the emulation module simply takes a note (in order to update the current state) that the virtual tape in question is now in drive 1, without actually having to perform any physical movements. No physical robot movements are necessary because disk drives allow random access. Once data is actually written by the DPA using drive 1, the emulation module knows exactly which virtual tape to write to by consulting its state table. It can then write directly to the appropriate virtual tape using the random access interface of the back-end disk subsystem. Hence, operations that typically take minutes to perform in PTLs (for example rewinding a tape) can be emulated in milliseconds. Additional information relevant to the instruction, such as the time the tape was put in drive 1, for example, may also be recorded as desired.

Due to the fact that the VTL responds differently depending on the type of DPA command that is received, the method, in step 26, determines whether the DPA command includes instructions or data movement. If the DPA command includes instructions, the method proceeds to step 28 and records any state changes caused thereby, as explained above. If, in contrast, the DPA command requires data movement such as, for example, writing data, the method proceeds to step 30 where DPA commands for writing data to a particular location, in what the DPA thinks is a PTL, are also performed virtually. DPA commands for writing data will include the data to be copied as well as information indicating where in a PTL the data should be copied. In this case, however, the emulation module passes the data to another module that copies the data to a location on a disk in the VTL that virtually corresponds to the particular location provided in the DPA command. In other words, the data is copied to one or more disk regions that correspond to a virtual tape that in turn corresponds to a physical tape. The particular location in the VTL where the data is saved may have been previously designated as corresponding to that location or may be labeled after the data is saved thereto as corresponding to that location.

By way of example, if the DPA command indicated that the data should be copied to physical tape 1 at location Y of PTL Z, the data will be copied to a particular location in the VTL that logically corresponds to physical tape 1, location Y, PTL Z. Therefore, if the DPA sends a subsequent command requesting data from what, in the DPAs mind, should be, for example, physical tape 2, location X, the data in the VTL which corresponds to physical tape 2, location X may be retrieved and provided to the DPA. Retrieving data requested by the DPA in this manner is faster and less cumbersome then having to retrieve and access an actual physical tape because there are no moving parts and the data may be accessed randomly as opposed to sequentially.

The data copied to the VTL may be used to create actual physical tapes by playing back the data as explained above. The data may also be further copied, to perform restores for example, to any other type of disk based storage medium as desired. Data in one VTL may be copied to another remotely located VTL as explained in the Applicants' pending U.S. patent application having application Ser. No. 10/218,249, the entirety of which is hereby incorporated by reference. The data in the VTL may also be copied to removable disks located in the VTL so that backup data may be stored offsite as desired.

Once the state changes have been recorded or the data copied or both, the method proceeds to step 32. In step 32, an error check is performed to determine whether all of the previous steps have been performed successfully. It is important to note that any number of error checks may be included throughout the method. That is, in this embodiment, a global error check is performed, but performing individual error checks after each step of the method is certainly within the scope of the present invention.

If errors are detected in step 32, the method proceeds to step 21 where an error signal is sent to the DPA as explained above. It is important to note that the error signal may include additional information regarding the cause of the error, as desired. If, in contrast, there are no detected errors, an acknowledgement signal is sent to the DPA (step 34) indicating to the DPA that the one or more DPA commands sent to the VTL have been successfully performed. Of course, where the DPA's commands were related to retrieving data from the VTL, the requested data is sent to the DPA along with the acknowledgement signal. The emulation module acknowledges the commands of the DPA despite the fact that any instructions pertaining to the movement of the typical components of a PTL were emulated and not actually performed physically.

Acknowledging the DPA's commands satisfies the DPA and allows the DPA to send subsequent commands. The commands sent by the DPA are typically low-level commands such as SCSI commands or FC network commands (FC infrastructures are based on SCSI commands but allow for more flexible network topologies). Other interfaces may also be possible, such us, for example, IP-based protocols (such as iFC, iSCSI, etc.). The emulation module responds to DPA commands on the same level as they are sent. Furthermore, the emulation module only utilizes tape library commands that are required by the DPA to communicate with or write data to a PTL. As a consequence, the emulation module does not need to emulate every command of a PTL but only commands that are actually used by the supported DPAs. This enables the emulation module to be configured to emulate the necessary commands for a wide variety of PTLs and DPAs with minimal overhead.

The emulation module may be configured to perform Logical Unit Number (LUN) mapping as part of the emulation such that the servers that are supposed to see each VTL can actually see them on the network, whereas other network nodes cannot. Furthermore, the emulation module may emulate different libraries for different users or customers and limit their access to their own library specifications. Alternatively, each user or customer may have his or her own emulation module.

Figure 2:
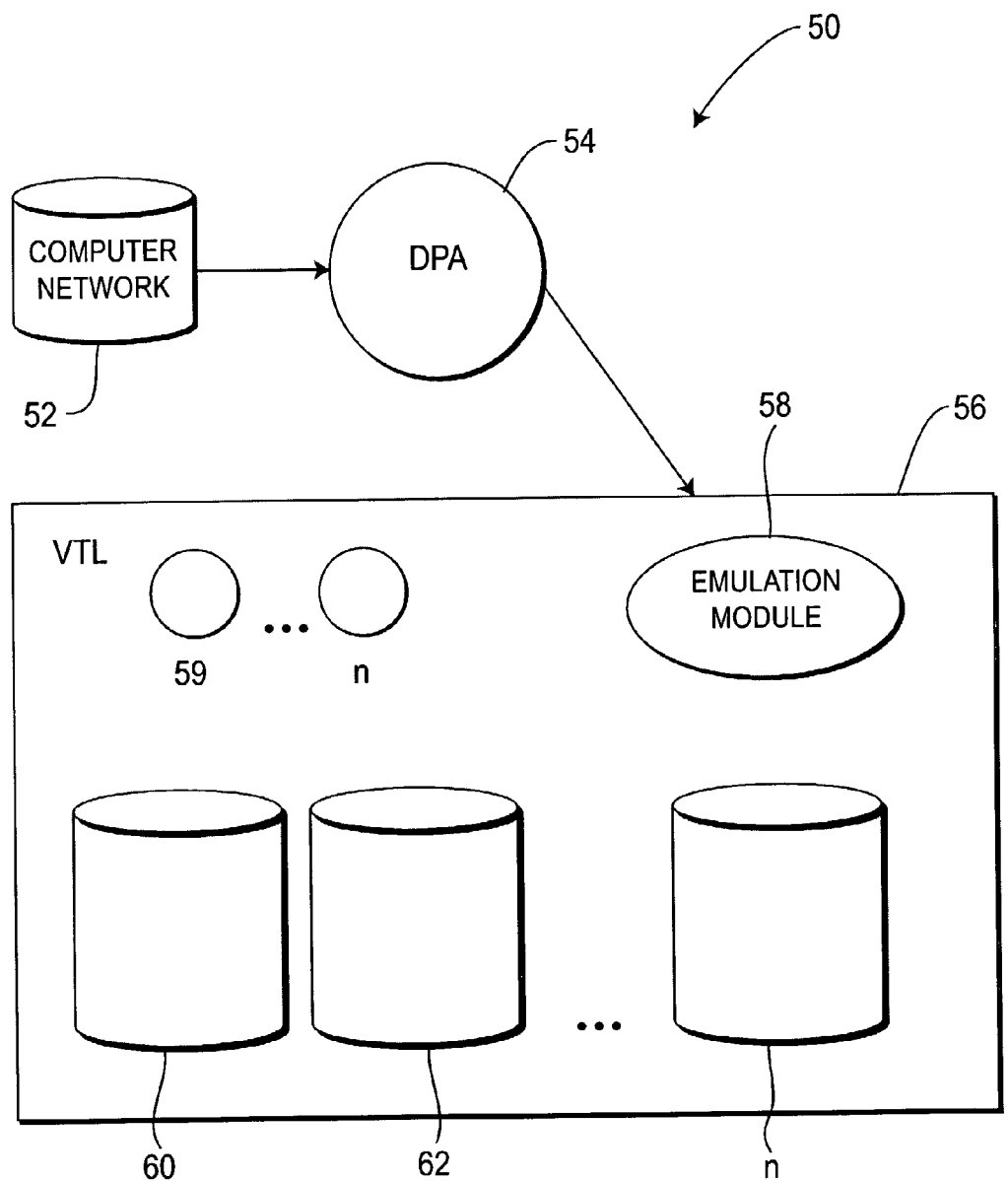
FIG. 2 is a system where tape library commands are emulated and backup data is copied from a DPA to a VTL in accordance with the preferred embodiment of the invention.
Figure 3:
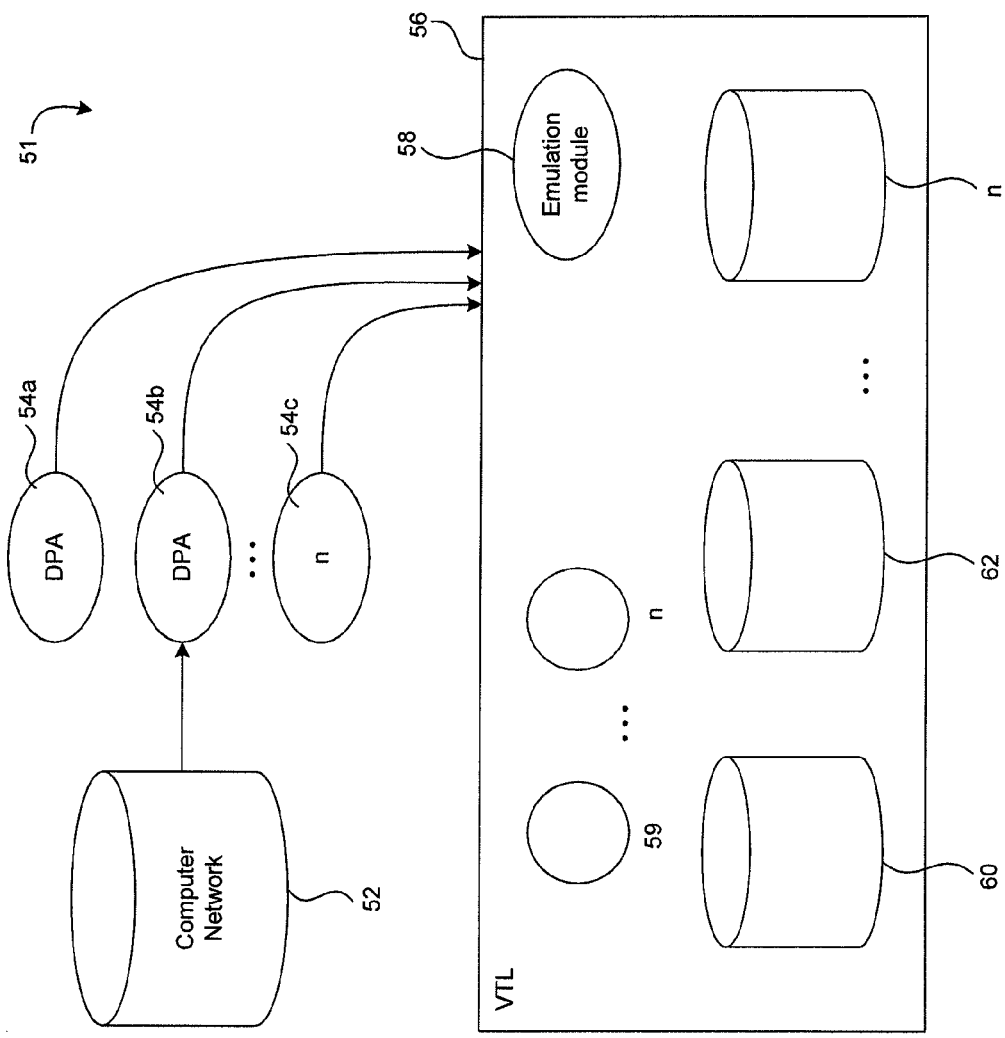
FIG. 3 is a system where tape library commands are emulated and backup data is copied from multiple DPAs to a VTL in accordance with the preferred embodiment of the invention.

Referring now to FIG. 2 and FIG. 3, there is shown in FIG. 2 a system 50 wherein a tape library command set supported by a DPA for writing data to a PTL is emulated so that data may be written to a VTL. Similarly, FIG. 3 shows a system 51 wherein a tape library command set is supported by multiple DPAs 54a-c for writing to a PTL. In one embodiment, the systems 50 or 51 comprise a computer network 52 where data is generated, one or more DPAs 54 used to backup that data and a VTL 56 where the backup data written by the one or more DPAs 54 is stored. Typically, a DPA 54 uses commands designed for writing backup data to a PTL. These same commands now work with a VTL 56. This is because the VTL 56 comprises an emulation module 58 so that data written using such DPAs may nevertheless be copied to a disk based storage repository such as a VTL 56.

A DPA 54 sends commands, which are acknowledged by the emulation module 58, indicating that such commands were successfully performed. Of course, any DPA commands relating to actual physical movement of the typical components of a PTL are not actually carried out, as a VTL 56 lacks such components. Instead, those types of instructions are performed virtually by adding them to a state table of all such instructions received from a DPA 54. If a DPA command is not performed successfully, an error message is sent to the DPA 54.

When actual data needs to be saved or otherwise copied to the VTL 56, the emulation module 58 uses other modules 59 . . . n to copy the data to a particular location in the VTL 56 that logically corresponds to the location indicated in the DPA's commands, as explained above. That is, the data may be saved anywhere in the VTL 56 on storage disks 60 . . . n, but wherever it is saved will logically correspond to the location where the DPA 54 indicated that the data should be stored. In particular, a RAID configuration could be used and one or more streams that are sequential from the DPA 54 to the emulation module 58 might be striped or otherwise load-balanced across multiple disks. Further, when copying the data to the VTL 56, the emulation module 58 may translate the data to a format used by the VTL, 56 as explained above.

By way of example, if a DPA sends a command indicating that a particular batch of data should be saved to tape 1, location Y, PTL Z, an emulation module of VTL Z (i.e. a VTL having the specifications of PTL Z) will copy that data, for example, to a particular address in a disk in VTL Z which logically corresponds to tape 1, location Y, PTL Z. The address in that disk may have been predetermined to correspond to tape 1, location Y or it may have been labeled as such after the data was copied thereto.

It is important to note that any type of data may be copied to or otherwise stored in the disks of a VTL—not just backup data. That is, the present invention is not limited to just copying backup data as defined in paragraph 15 which was so defined for purposes of describing the preferred embodiments, but rather may be any type of data. For example, an alternate embodiment of the invention is to copy multimedia data in the same fashion as described above. It should also be noted that the determination made in step 26 of FIG. 1 may be performed in two separate determinations, as desired.

Although the present invention has been described in detail, it is to be understood that the invention is not limited thereto, and that various changes can be made therein without departing from the spirit and scope of the invention, which is defined by the attached claims.

What is claimed is:

1. A method comprising:
configuring a virtual tape library (VTL) in communication with a plurality of data protection applications (DPAs) to emulate a plurality of physical tape libraries (PTLs);
operating the VTL to emulate the plurality of PTLs by translating, in the VTL, a plurality of DPA commands in a plurality of formats used by the plurality of DPAs for DPA-to-PTL communication, into a single format for use by the VTL, wherein each of the DPAs uses a DPA command of the plurality of DPA commands to backup data at one of the plurality of PTL, wherein configuring the VTL to emulate the plurality of VTLs comprises storing a plurality of VTL specifications accessible to the VTL, each specification corresponding to a different one of the plurality of PTLs;
receiving one of the plurality of DPA commands, at the VTL, for writing backup data from one of the plurality of DPAs,
saving the data of one DPA command of the plurality of DPAs commands to a location in the VTL as the one DPA command arrives to the VTL, and
associating the location of the saved data in the VTL with a location indicated in a PTL identifier, the PTL identifier specifying a location in the PTL as a destination for the data.

2. The method of claim 1, further comprising selecting one of the plurality of VTL specifications in response to receiving, at the VTL, a DPA command of the plurality of DPA commands from one of the plurality of DPAs to one of the plurality of PTLs corresponding to the selected one of the plurality of VTL specifications.

3. A method for emulating tape library commands between a plurality of data protection applications (DPAs) and a virtual tape library (VTL), the method comprising:
configuring the VTL based on a specification of a physical tape library (PTL);
receiving, at the VTL from the plurality of DPAs, a plurality of PTL commands for writing backup data;
determining, at the VTL, whether the plurality of PTL commands can be performed based on a configuration of the VTL, wherein the configuration of the VTL corresponds to the specification of the PTL;
in response to determining that the plurality of PTL commands can be performed based on the configuration of the VTL and that the plurality of PLT commands conform to available internal resources of the VTL, translating one of the plurality of PTL commands from one of the plurality of DPAs, by the VTL, from a format for communication between the one DPA of the plurality of DPAs and the PTL to a format for performing the one PTL command by the VTL, wherein the VTL is configured to translate a plurality of formats for DPA-to-PTL communication into the format for performing each of the plurality of PTL commands by the VTL; and
performing, on the VTL, the translated PTL command of the plurality of PTL commands.

4. The method according to claim 3, wherein each of the plurality of PTL commands comprises:
data to be written, and
an identifier of a location of the PTL as a destination for the data.

5. The method according to claim 4, wherein as each of the plurality of PTL commands for writing backup data arrive at the VTL, the VTL saves the backup data to a location of the VTL and then associates the location with the location of the PTL, based on the identifier.

6. The method according to claim 3, wherein the VTL saves the configuration to a file that is automatically made accessible to the plurality of DPAs upon activation of the VTL.

7. The method of claim 3, wherein one of the plurality of PTL commands for writing backup data is preceded by a command to retrieve a tape to a tape drive for the writing of the backup data.

8. The method according to claim 3, wherein the performing comprises:
recording state changes on the VTL for a physical PTL command of the plurality of PTL commands, and
performing a data movement command directly on the VTL.

9. The method according to claim 3, further comprising:
operating the VTL to emulate a different one of a plurality of PTLs for each of a plurality of different users.

10. The method according to claim 9, further comprising:
in the VTL, limiting access by the plurality of users so that each said user can only access said user's own emulated PTL.

11. The method according to claim 9, wherein each of the users is a DPA of the plurality of DPAs, the method further comprising:
in the VTL, limiting access of the plurality of DPAs so that each of the DPAs can only see its own emulated PTL.

12. The method according to claim 3, further comprising:
using at least one of LUN mapping or network zoning in the VTL to specify hosts that can interact with an emulated PTL.

13. The method according to claim 3, further comprising:
using LUN mapping in the VTL to selectively allow certain network nodes to see the VTL while preventing other network nodes from seeing the VTL.

14. A system for emulating a plurality of tape library commands, comprising:
a virtual tape library (VTL) in communication with a plurality of data protection applications (DPAs), said VTL configured to:
receive, from a DPA of the plurality of DPAs, a physical tape library (PTL) data backup command of the plurality of tape library commands, and
determine whether the PTL command of the plurality of tape library commands can be performed based on a configuration of the VTL, wherein the configuration of the VTL corresponds to a specification of the PTL,
in response to determining that the PTL command of the plurality of tape library commands can be performed based on the configuration of the VTL and that the PTL command of the plurality of tape library commands conforms to the available internal resources of the VTL, translate the PTL command of the plurality of tape library commands from a format for DPA-to-PTL communication between one of the plurality of DPAs and the PTL to the format to perform the PTL command of the plurality of tape library commands by the VTL, wherein the VTL is configured to translate a plurality of formats for DPA-to-PTL communication into the format to perform the PTL command of the plurality of tape library commands by the VTL,
perform the translated PTL command of the plurality of tape library commands, and
emulate a different one of a plurality of PTLs for each of a plurality of different users.

15. The system according to claim 14, wherein said VTL is further configured to:
record state changes for a physical PTL command, and
perform a data movement command of the plurality of tape library commands.

16. The system according to claim 14, further comprising:
in the VTL, limiting access by the plurality of users so that each said user can only access said user's own emulated PTL.

17. The system according to claim 14, wherein each of the users is a DPA of the plurality of DPAs, the method further comprising:
in the VTL, limiting access of the plurality of DPAs so that each of the DPAs can only see its own emulated PTL.

18. The system according to claim 14, further comprising:
using at least one of LUN mapping of network zoning in the VTL to selectively allow certain network nodes to see the VTL while preventing other network nodes from seeing the VTL.

19. The method of claim 1, wherein at least two of the plurality of DPAs are from different DPA producers.

* * * * *